United States Patent
Nunan et al.

(10) Patent No.: US 10,828,623 B2
(45) Date of Patent: Nov. 10, 2020

(54) HYDROCARBON TRAP CATALYST

(71) Applicant: UMICORE AG & CO. KG, Hanau-Wolfgang (DE)

(72) Inventors: John Nunan, Tulsa, OK (US); David Moser, Ortonville, MI (US); Chad Alltizer, Broken Arrow, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 99 days.

(21) Appl. No.: 15/983,246

(22) Filed: May 18, 2018

(65) Prior Publication Data

US 2019/0351393 A1 Nov. 21, 2019

(51) Int. Cl.
*B01J 21/04* (2006.01)
*B01J 21/06* (2006.01)
(Continued)

(52) U.S. Cl.
CPC ............ *B01J 23/44* (2013.01); *B01D 53/945* (2013.01); *B01D 53/9468* (2013.01); *B01D 53/9472* (2013.01); *B01J 23/464* (2013.01); *B01J 29/7615* (2013.01); *B01J 35/0006* (2013.01); *B01J 35/04* (2013.01); *F01N 3/2803* (2013.01);
(Continued)

(58) Field of Classification Search
CPC . B01J 21/04; B01J 21/06; B01J 21/063; B01J 21/066; B01J 21/08; B01J 21/10; B01J 21/12; B01J 21/14; B01J 23/002; B01J 23/10; B01J 23/44; B01J 23/63; B01J 23/8906; B01J 23/8913; B01J 23/892; B01J 23/8926; B01J 23/894; B01J 35/0006; B01J 35/04; B01J 29/7615; B01D 53/945; B01D 53/9468; B01D 53/9472; F01N 3/2803
See application file for complete search history.

(56) References Cited

U.S. PATENT DOCUMENTS 7,998,424 B2 * 8/2011 Bergeal ................ B01D 53/945
422/180
8,293,182 B2 * 10/2012 Boorse ............... B01D 53/9468
422/180
(Continued)

OTHER PUBLICATIONS

Ch. Baerloeher, et al., "Atlas of Zeolite Framework Types", 5th revised edition, 2001, ISBN: 0-444-50701-9, pp. 1-303.
(Continued)

*Primary Examiner* — Cam N. Nguyen
(74) *Attorney, Agent, or Firm* — Smith, Gambrell & Russell, LLP

(57) ABSTRACT

The present invention relates to a catalyst comprising a carrier substrate of the length L extending between substrate ends a and b and two washcoat zones A and B, wherein washcoat zone A comprises a redox active base metal and palladium supported on a zeolite and/or refractory oxide support and extends starting from substrate end a over a part of the length L, and washcoat zone B comprises the same components as washcoat A and an additional amount of palladium and extends from substrate end b over a part of the length L, wherein $L=L_A+L_B$, wherein $L_A$ is the length of washcoat zone A and $L_B$ is the length of substrate length B.

20 Claims, 2 Drawing Sheets

(51) Int. Cl.
 B01J 21/08 (2006.01)
 B01J 21/10 (2006.01)
 B01J 21/12 (2006.01)
 B01J 21/14 (2006.01)
 B01J 23/00 (2006.01)
 B01J 23/10 (2006.01)
 B01J 23/44 (2006.01)
 B01J 23/63 (2006.01)
 B01J 23/89 (2006.01)
 B01J 35/00 (2006.01)
 B01J 35/04 (2006.01)
 B01J 29/76 (2006.01)
 B01D 53/94 (2006.01)
 F01N 3/28 (2006.01)
 B01J 23/46 (2006.01)
 F01N 3/10 (2006.01)

(52) U.S. Cl.
 CPC ........... B01D 2255/1023 (2013.01); B01D 2255/1025 (2013.01); B01D 2255/20738 (2013.01); B01D 2255/502 (2013.01); B01D 2255/9022 (2013.01); B01D 2255/9032 (2013.01); F01N 3/101 (2013.01); F01N 2510/0682 (2013.01); F01N 2510/0684 (2013.01)

(56) References Cited

U.S. PATENT DOCUMENTS

| | | | | |
|---|---|---|---|---|
| 8,540,952 | B2* | 9/2013 | Swallow | B01D 53/94 423/213.2 |
| 8,637,426 | B2* | 1/2014 | Hoke | B01D 53/945 502/339 |
| 9,242,212 | B2* | 1/2016 | Phillips | B01J 35/04 |
| 9,597,636 | B2* | 3/2017 | Sonntag | F01N 3/106 |
| 9,611,773 | B2* | 4/2017 | Brown | B01D 53/9422 |
| 9,707,542 | B2* | 7/2017 | Bergeal | B01J 37/0244 |
| 9,849,423 | B2* | 12/2017 | Chiffey | B01J 29/7415 |
| 9,937,489 | B2* | 4/2018 | Larsson | B01D 53/9436 |
| 10,201,807 | B2* | 2/2019 | Larsson | B01J 35/0006 |
| 10,286,359 | B2* | 5/2019 | Chiffey | B01J 29/40 |
| 10,500,571 | B2* | 12/2019 | Greenham | B01J 37/08 |
| 2017/0128922 | A1 | 5/2017 | Chen et al. | |
| 2018/0045097 | A1* | 2/2018 | Tang | B01J 37/0246 |
| 2018/0214824 | A1* | 8/2018 | Dumbuya | B01J 29/7615 |
| 2018/0221860 | A1* | 8/2018 | Larsson | B01J 37/0244 |
| 2018/0353902 | A1* | 12/2018 | Chiffey | B01J 37/0228 |
| 2018/0353903 | A1* | 12/2018 | Chiffey | B01J 23/02 |
| 2019/0022584 | A1* | 1/2019 | Hilgendorff | B01J 35/0006 |

OTHER PUBLICATIONS

DIN 66132:Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).

SAE International J. Engines 2013-01-1297 (vol. 6, Issue 2), Jun. 2013 "HC Traps for Gasoline and Ethanol Applications". John Nunan, et al.

International Search Report dated Aug. 30, 2019 for International Patent Application No. PCT/EP2019/062627 (4 pages).

Written Opinion of the International Searchng Authority dated Aug. 30, 2019 for International Patent Application No. PCT/EP2019/062627 (6 pages).

* cited by examiner

HYDROCARBON TRAP CATALYST

The present invention relates to a hydrocarbon trap catalyst for trapping hydrocarbons during cold start of combustion engines operated with a predominantly stoichiometric air/fuel ratio.

It is well known in the field of combustion engines that fuel combustion is not complete and as a result gives emissions of pollutants like unburned hydrocarbons (HC), carbon monoxide (CO), nitrogen oxides ($NO_x$) and particulate matter (PM). In order to improve air quality, emission limits legislations are in place to achieve lower emissions of pollutants from stationary applications and from mobile sources. For mobile sources like passenger cars, the implementation of active strategies such as improved combustion and optimized A/F or lambda control have been carried out in an effort to decrease the emission of pollutants. Improvement of fuel-air mixing (A/F ratio) as primary measure yielded considerable diminution of pollutants. However, due to more stringent legislations over the years, the use of heterogeneous catalysts has been made inevitable.

For gasoline engines, so-called three-way catalysts (TWC) enable the elimination of HC, CO and $NO_x$. Optimal use of the TWC is around Lambda=1+/−0.005 where the air/fuel ratio is equal to 14.56. Above these values, the exhaust gas is said to be lean and contains an excess of oxidants such as $O_2$ and NOx, and CO and HC are catalytically oxidized to carbon dioxide and water. Below this value, the exhaust gas is said to be rich and contains an excess of reductants such as $H_2$, CO and HCs and mainly $NO_x$ is reduced to nitrogen using e.g. CO as a reducing agent.

Optimal conversion of HC, CO and $NO_x$ is achieved at Lambda=1. However, gasoline engines operate under oscillating conditions between slightly lean and slightly rich conditions. Under purely rich conditions, the operation of a TWC, oxygen storage materials (OSMs) in the form of Cerium-Zirconium mixed oxides were included in the formulation of the TWC.

Like other catalysts, three-way-catalysts are not active until they reach a certain temperature, the so-called light-off temperature, which is usually around 200° C. Below this temperature, for example during cold start, other measures need to be taken in order to avoid escape of pollutants via the tailpipe. This is of particular importance in the case of hydrocarbons because they are mainly produced during cold start.

This situation has resulted in the development of so-called hydrocarbon traps. HC traps are basically storage materials which adsorb hydrocarbons while the exhaust gas is cold and the three-way-catalyst is not yet active (for example during a cold start) and desorb and release them when the exhaust-gas temperature is higher and the three-way-catalyst has reached its light-off temperature.

Materials for storing hydrocarbons are usually zeolitic materials or so-called molecular sieves. Examples are for example mordenite (MOR), Y-zeolites (FAU), ZSM-5 (MFI), β-zeolites (BEA) and mixtures thereof. These are preferably used in H-form or $NH_4$-form or are exchanged with transition metals.

Catalyzed HC-traps integrate an oxidizing function into the storage function and preferably consist of an adsorber material containing zeolitic material and a three-way catalyst, for example in the form of a separate layer, containing oxygen storage components and platinum group metals like platinum, palladium and rhodium. In many designs the adsorbent layer is located as the bottom or first layer applied to the support substrate and the TWC function as a second or overcoat top-layer. This allows for the direct oxidation of hydrocarbons desorbed and released by the adsorbing material.

The oxidation can be achieved by oxygen present in the gas phase or oxygen from an "oxygen carrier" in the trap washcoat. The latter component can include redox active base metals such as those derived from the oxides of transitions metals such as Fe, Mn, Co, Ni and Cu, rare earth elements such as Ce, Pr, Sm, Tb or P block elements such as Sn and In.

In standard TWC designs the platinum group metals (PGMs) are uniformly distributed through the full length of the HC trap substrate or are localized as a highly concentrated platinum group metal zone at the catalyst inlet with respect to the direction of exhaust flow.

In a typical HC trap application the emission system consists of a close coupled TWC catalyst with the HC trap located as a separate converter in a cool under-body location. In this type application the HC trap heats up slowly with a large temperature gradient of up to 100° C. between the front inlet end of the trap as compared to the rear outlet. Hydrocarbons are initially adsorbed by the inlet end of the trap with respect to exhaust flow as they contact this location of the trap initially. As the trap heats up a desorption/adsorption process occurs such that the adsorbed hydrocarbons move from the front of the trap to the rear in a similar way to the movement of a solvent with optionally other dissolved components in a chromatographic column whereby the solvent and soluble components gradually move from the bottom of the column to higher levels. Desorption of the trapped molecules in the front hotter region of the trap is followed by rapid re-adsorption by the rear cooler regions of the trap until the adsorbed molecules gradually reach the rear section of the trap where they are finally desorbed into the gas phase and escape the trap.

It has now been found that because of this adsorption—desorption process and movement of the trapped hydrocarbons the location or placement of the highly concentrated platinum group metals at the inlet of the trap is not the optimum strategy for zoning. This arises as any possibility for hydrocarbon conversion is lost once the adsorbed hydrocarbons move past this inlet zone on their way to the rear of the trap. On the other hand with the zone of high platinum group metal located at the rear of the trap all of the adsorbed hydrocarbons must move past this zone and if the platinum group metal concentration is sufficiently high conversion can occur.

Accordingly, the present invention pertains to a catalyst comprising a carrier substrate of the length L extending between substrate ends a and b and two washcoat zones A and B, wherein washcoat zone A comprises a compound of a redox active base metal selected from the group consisting of Cu, Ni, Co, Mn, Fe, Cr, Ce, Pr, Tb, Sn and In as well as palladium supported on a zeolite and/or on a support oxide and extends starting from substrate end a over a part of the length L, and washcoat zone B comprises the same components as washcoat zone A and an additional amount of palladium and extends from substrate end b over a part of the length L, wherein $L=L_A+L_B$, wherein $L_A$ is the length of washcoat zone A and $L_B$ is the length of washcoat zone B.

Accordingly, according to the present invention the redox active base metal compound and the zeolite and/or support oxide are distributed uniformly through the full length L of the carrier substrate, whereas the palladium is present in washcoat zone B at a higher concentration compared to washcoat zone A.

In an embodiment of the present invention washcoat zone A comprises two layers A1 and A2, which both extend over the length $L_A$, wherein layer A1 comprises a compound of a redox active base metal selected from the group consisting of Cu, Ni, Co, Mn, Fe, Cr, Ce, Pr, Tb, Sn and In as well as palladium supported on a zeolite and/or on a support oxide and layer A2 comprises rhodium, and washcoat zone B comprises two layers B1 and B2, which both extend over the length $L_B$, wherein layer B1 comprises the same components as layer A1 and layer B2 comprises the same components as layer A2 and wherein layers B1 and B2 comprise an additional amount of palladium compared to layers A1 and A2.

In embodiments of the present invention layer A2 can besides rhodium comprise one or more additional platinum group metals, in particular platinum and palladium, preferably palladium. In the latter case the weight ratio Pd:Rh is for example 10:1 to 1:10.

In preferred embodiments of the present invention washcoat zones A and B are, apart from the higher amount of palladium in washcoat zone B, identical.

Likewise, layers A1 and B1 are, apart from the higher amount of palladium in layer B1, identical and layers A2 and B2 are, apart from the higher amount of palladium in layer B2, identical.

A preferred redox active base metal is copper, manganese and iron. A particularly preferred redox active base metal is iron.

In embodiments of the present invention the redox active base metal compound is present in cationic or in oxidic form. If present in cationic form a counter ion must be present which can be the zeolite. In other words the metal cation is located within the three-dimensional zeolite structure as an ion exchanged species and neutralizes its negative charge.

Alternatively or in addition the redox active base metal compound can be present in oxidic form, in case of iron for example in form of $Fe_2O_3$, and is dispersed on the zeolite crystallites as finely dispersed metal oxide crystallites. In any case, the redox active base metal compound can be present in cationic form within the zeolite structure or in oxidic form within and/or on the surface of the zeolite.

The redox active base metal compound is usually present in washcoat zones A and B in an amount of 1.0 to 30 g/l, based on the volume of the carrier substrate and calculated as metal oxide, in case of iron as $Fe_2O_3$.

In case the palladium is supported on a zeolite, the zeolite preferably belongs to the structure type codes (as defined in the Atlas of Zeolite Framework Types, Elsevier, sixth revised edition, 2007) BEA, FAU, FER, MFI or MOR. A preferred zeolite belongs to the structure type code BEA. Preferred zeolites have a SAR (silica-to-alumina ratio) value of 2 to 100, in particular 5 to 50.

The palladium in layer A and A1, respectively, can be present in cationic, metallic or oxidic form and is preferably present within and/or on the surface of the zeolite.

The zeolite is usually present in washcoat zones A and B in an amount of 120 to 340 g/l based on the volume of the carrier substrate.

In case the palladium is supported on a support oxide, suitable support oxides are alumina, silica, magnesia, titania, ceria, zirconia as well as mixtures or mixed oxides comprising at least two of these materials. Usually, they have a BET surface of 30 to 250 m²/g, preferably of 100 to 200 m²/g (determined according to German standard DIN 66132). Preferred are alumina, alumina/silica mixed oxides and magnesia/alumina mixed oxides. In case alumina is used, it is preferably stabilized, for example with 1 to 6 weight percent, in particular 4 weight percent, of lanthana.

In particular preferred support oxides have oxygen storage properties and are for example ceria, cerla-zirconia mixed oxides or alumina-ceria mixed oxides.

In particular, the support oxide is selected from the group consisting of alumina, alumina/silica mixed oxides, magnesia/alumina mixed oxides, ceria, ceria-zirconia mixed oxides and alumina-ceria mixed oxides.

The support oxide in washcoat zone A and B is preferably present in an amount of 1.0 to 50.0% by weight based on the weight of washcoat zone A and washcoat zone B, respectively.

The palladium is preferably fixed to the surface of the support oxide in oxidic or metallic state.

The palladium is usually present in washcoat zone A and A1, respectively, in an amount of 0.04 to 4.0 g/l, based on the zone volume of the carrier substrate and calculated as palladium metal.

The palladium content in washcoat zone B is higher than in washcoat zone A and is usually 2 to 20 g/l, based on the zone volume of the carrier substrate and calculated as palladium metal.

The advantages of palladium compared to other platinum group metals like platinum and rhodium are the lower cost and in particular its high effectiveness for burning hydrocarbons, especially large hydrocarbons such as branched alkenes/alkanes and aromatics that will be retained within the trap to higher temperatures. Further, in the case of palladium there is a high performance gradient with respect to palladium loading and HC light-off. The light-off temperatures can decrease by over 100° C. as we move from low Pd loadings of 10 g/ft³ (0.35 g/l) to loadings of just over 100 g/ft³ (3.5 g/l) after moderate to severe aging.

In case the catalyst of the present invention comprises washcoat layers A1 and A2 and layers B1 and B2, respectively, rhodium and optionally additional platinum group metals, for example palladium, contained in layers A2 and B2 is usually supported on a carrier material.

As carrier material all materials can be used which are known to the skilled person for that purpose. Usually, they have a BET surface of 30 to 250 m2/g, preferably of 100 to 200 m2/g (determined according to German standard DIN 66132) and are in particular alumina, silica, magnesia, titania, as well as mixtures or mixed oxides comprising at least two of these materials.

Preferred are alumina, alumina/silica mixed oxides and magnesia/alumina mixed oxides. In case alumina is used, it is preferably stabilized, for example with 1 to 6 weight percent, in particular 4 weight percent, of lanthana.

The rhodium is usually present in layers A2 and B2 in an amount of 0.04 to 4.0 g/l, based on the volume of the carrier substrate and calculated as rhodium metal.

In embodiments of the present invention washcoat zone A extends over 70 to 95% of the length L of the carrier substrate, preferably 73 to 90% and washcoat zone B extends over 5 to 30% of the length L of the carrier substrate, preferably 10 to 27%.

In embodiments of the present invention the carrier substrate of the length L can be a flow through or a filter substrate. Such carrier substrates are usually made of cordierite or metal and are described in literature and available on the market.

The catalyst of the present invention can be manufactured by known methods, in particular by a two-step process which comprises coating of the carrier substrate with a coating suspension (washcoat) which contains the components of washcoat zone A over its entire length L and dipping the coated carrier substrate in a aqueous solution containing a water soluble palladium compound until a length which corresponds with the length of washcoat zone B, so as to form washcoat zone B.

The coating in the first step is usually performed via conventional immersion, suction and pumping methods which are extensively described in the literature and known to the person of skill in the art.

The first and second step are usually followed by calcination and optionally thermal reduction in an atmosphere which contains forming gas.

The catalyst of the present invention is suitable for the treatment of exhaust gases of engines operated with a predominantly stoichiometric air/fuel ratio, the treatment of the exhaust gas being carried out by passing the exhaust gas over the inventive catalyst.

Accordingly, the present invention further relates to a method for treating the exhaust gas of an engine operated with a predominantly stoichiometric air/fuel ratio, characterized in that the exhaust gas is passed over an inventive catalyst wherein it enters the catalyst at substrate end a and exits it at substrate end b.

DETAILED DESCRIPTION

Figure 1:
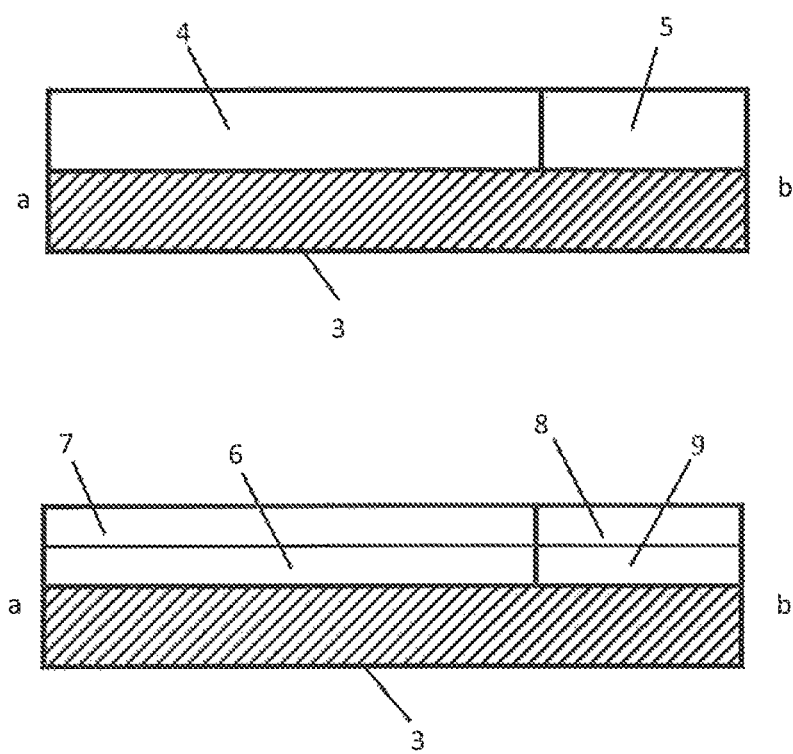
FIG. 1 illustrates catalysts according to the present invention.

FIG. 1 illustrates catalysts according to the present invention.

The upper part shows a detail of an inventive catalyst (1) which comprises a carrier substrate (3) which extends between substrate ends a and b and which carries washcoat zone A (4) and washcoat zone B (5).

The lower part shows a detail of another embodiment of the invention. Catalyst (2) comprises a carrier substrate (3) which extends between substrate ends a and b. Washcoat zone A comprises layer A1 (6) and A2 (7) whereas washcoat zone B comprises layer B1 (9) and layer B2 (8). Layers A1 (6) and B1 (9) differ only in that B1 (9) comprises a higher amount of palladium compared to A1 (6). Likewise, layers A2 (7) and B2 (8) differ only in that B2 (8) comprises a higher amount of palladium compared to A2 (7).

Comparison Example 1 a) Slurry preparation begins with addition of an alumina stabilized silica sol (Aeroperl 3375/20 purchased from Evonik) to water and mixing. This material represents 4.5 wt % of the final calcined washcoat loading. This step is followed by the addition of a boehmite (SASOL SCF-55 purchased from Sasol) and iron nitrate at contents of 1.0 and 4.5 wt % respectively of the final calcined washcoat. Finally, beta zeolite in the ammonium form and having a SAR value of 25 was added and the slurry was then aged for two days.

b) This slurry was then coated onto a ceramic substrate having 400 cpsi/4.3 mill cell structure and 4.66" round by 4.5" long giving a total volume of 1.26 Liters and a WC load of 3.636 $g/in^3$ or 222 g/l. Calcination of the coated trap was done at 540° C. in air.

c) After the application of the trap layer in step b), a thin coating of a three-way catalyst (TWC) layer was applied. The washcoat loading of the TWC layer was 1.5 $g/in^3$ and the platinum group metal loading was 10 $g/ft^3$ with a Pt:Pd:Rh=0:1:1.

The catalyst obtained is called CC1.

Example 1

An inventive catalyst was prepared as described in Example 1 but in this case a Pd solution band was applied by dipping one end of the catalyst in a Pd nitrate solution containing citric acid and 2 wt % ethanol. The substrate used was a 400 cpsi/4.3 mill cell structure, 4.66" round by 4.5" long giving a total volume of 1.26 Liters. The concentration of the dipped solution was adjusted such that with a solution band length of 3 cm (1.2") long the Pd concentration was 250 $g/ft^3$ in the dipped zone. The PGM loading averaged over the full part was 60 $g/ft^3$ @ 0:11:1 (includes the Pd in the band and in the TWC layer).

The catalyst obtained is called C1

Comparison of Comparison Example 1 and Example 1 a) CC1 and C1 both have the same three-way catalyst washcoat and the same platinum group metal loading of 10 $g/ft^3$ with Pt:Pd:Rh=0:1:1, the only difference being the presence of the Pd band at the outlet for C1.

b) Before testing catalysts CC1 and C1 were conditioned for 2 hours in a 4-Mode 60 second cycle as follows:

Operate engine at speed load to produce exhaust mass flow of 50±2.5 g/s per converter.

Catalyst Inlet Temperature (Inlet) 1560±10° F. during steady state (mode 1)

$O_2$ is set at 4.5±0.1% for mode 3. Since flow balancing is only done before the aging begins, $O_2$ concentration may not be exactly the same for all four legs. Further, only one leg was used to measure the 4.5±0.1% oxygen level in mode 3.

CO is set at 4.0±0.1% for mode 2, and 2.5±0.1% for mode 3

4-Mode 60 second cycle:

Mode 1: 40 s @ λ=1.000, no secondary air injection
Mode 2: 6 s @ 4% CO (rich), no secondary air Injection
Mode 3: 10 s @ 2.5% CO (rich), secondary air injection on
Mode 4: 4 s @ λ=1.000, secondary air injection on c) After conditioning catalysts CC1 and C1 were aged for 23 Hrs. as follows:

Operate engine at speed load to produce exhaust mass flow of 47±2.5 g/s per converter.

Catalyst Front Bed Temperature (FBed) 1580±10° F. during steady state (mode 1)

Catalyst Front Bed Temperature (FBed) 1740±10° F. during spike (mode 3)

$O_2$ is set at 4.5±0.1% for mode 3. Since flow balancing is only done before the aging begins, $O_2$ concentration may not be exactly the same for all four legs. Further, only one leg was used to measure the 4.5±0.1% oxygen level in mode 3.

CO is set at 4.0±0.1% for mode 2, and 2.5±0.1% for mode 3

If spikes do not reach 1740±10° F., first lower $O_2$ down to a minimum of 3.2±0.1%

If spikes still have not reached 1740±10° F., raise mode 3 CO up to a max of 3.0±0.1%

4-Mode 60 second cycle:
- Mode 1: 40 s @ λ=1.000, no secondary air injection
- Mode 2: 6 s @ 4% CO (rich), no secondary air injection
- Mode 3: 10 s @ 2.5% CO (rich), secondary air injection on
- Mode 4: 4 s @ λ=1.000, secondary air injection on d) The light-off temperatures ($T_{50}$-value) of the conditioned and aged catalysts CC1 and C1 were determined as follows: A Ford 4.6 L MPFI engine operating at 1700 RPM was used for the test. The GHSV was set to 35K and a temperature ramp from 125→500° C. was carried out at 51° C./minute. During the temperature ramp the lambda was set to 1.00±0.045 @ 1 Hz. The fuel used was Indolene clear and contained 20 ppm Sulfur The following results were obtained:

| Catalyst | $T_{50}$ [° C.] | | |
|---|---|---|---|
| | HC | CO | NOx |
| CC1 | 324 | 333 | 310 |
| C1 | 252 | 254 | 211 | e) The integral % Conversion of HC in the Lambda traverse test at 450, 500 and 600° C. of the conditioned and aged catalysts CC1 and C1 were determined as follows. For the 450° C. traverse test a Ford 4.6 L MPFI engine was used operating at 1700 RPM. The GHSV was set to 70K and a continuous Lambda sweep from 1.044/Lean→0.948/Rich over 458 seconds was carried out. The lambda at stoich=1.00±0.045 @ 1 Hz. The fuel used was Indolene clear with 20 ppm Sulfur. An "Integral Performance Number" for each component was calculated based on conversion between Lambda 1.01 and 0.99. The 500° C. test differed from the 450° C. sweep in that it was done over a time period of 680 seconds and the lambda at stoichiometry was 1.00±0.055 @ 1 Hz. The 600° C. sweep was done under the same conditions as the 500° C. one except for the higher temperature.

The following results were obtained:

| Catalyst | Integral % Conversion of HC | | |
|---|---|---|---|
| | 450° C. | 500° C. | 600° C. |
| CC1 | 89.4 | 88.7 | 89.8 |
| C1 | 93.4 | 91.7 | 96.0 |

Comparison Example 2

Comparison Example 1 was repeated with the only difference that the PGM content of the TWC layer was higher and consisted of Pd+Rh=50 g/ft³ @0:10:1. The catalyst obtained is called CC2

Example 2

An inventive catalyst was prepared as described in Comparison Example 2 above except that in this case part of the Pd=25 g/ft³ was added to the trap layer to give a homogeneous distribution through the full length of the part. All the Rh was added to the TWC layer at 5 g/ft³. The remainder of the Pd was then applied as a short band by dipping one end of the catalyst in a Pd nitrate solution containing citric acid and 2 wt % ethanol. The targeted band length was 0.5 Inches. The concentration of the dipped solution was adjusted such that with a solution band length of 1.25 cm (0.5") long the total Pd concentration was 250 g/ft³ in the dipped zone. The PGM loading averaged over the full part was 55 g/ft³ @ 0:10:1 (includes the Pd in the band and in the trap layer). The catalyst obtained is called C2.

Comparison of Comparison Example 2 and Example 2

Figure 2:
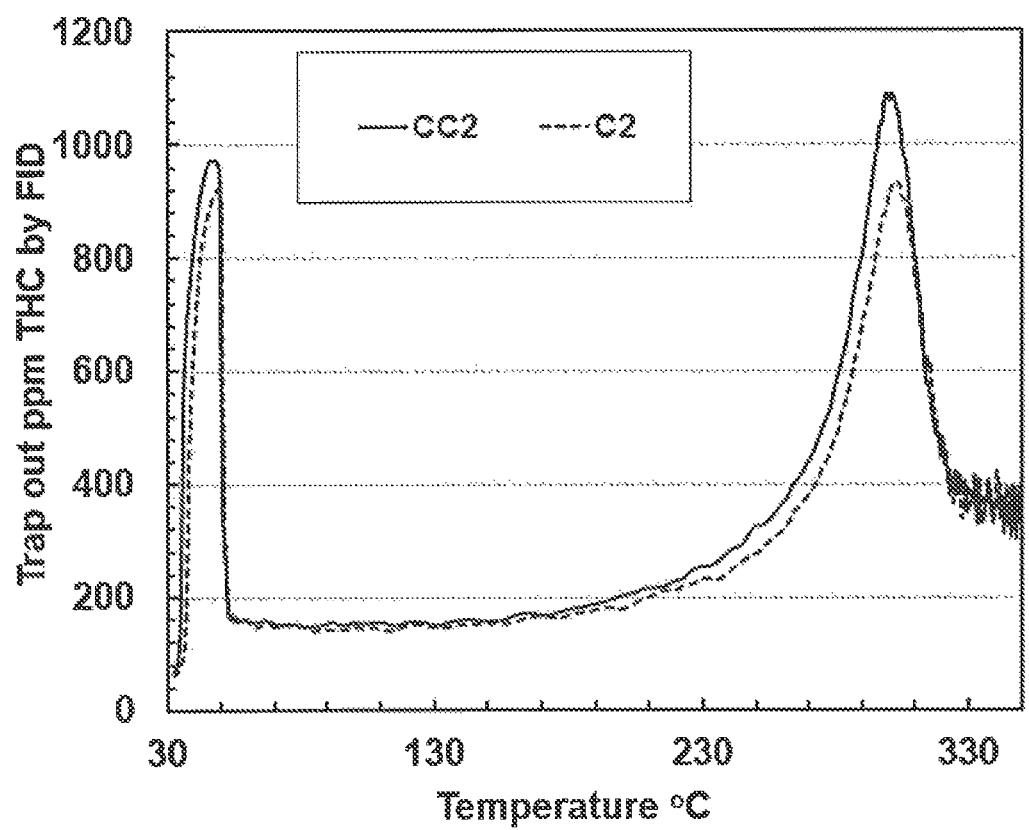
FIG. 2 shows the total HC out emissions for both CC2 and C2.

The catalysts were aged as described above using the 2 Hr 4-mode pre-conditioning step followed by a 23 hour 4-mode aging step with P present in the fuel. Testing was carried out using the procedure as described in Nunan et. al. SAE 2013-01-1297. The results are summarized in FIG. 2 where the total HC out emissions for both CC2 and C2 are compared. It is evident that the catalyst of the present invention with the Pd band at the rear has lower Trap out emissions, both for the initial adsorption step in the temperature range of 30-55° C. and the high T release of the strongly bound HCs in the temperature range of 230-330° C. Thus, the presence of the Pd band at the rear has improved both HC adsorption but also conversion at higher temperatures resulting reduced HC emissions.

The invention claimed is:

1. Catalyst comprising a carrier substrate of the length L extending between substrate ends a and b and two washcoat zones A and B, wherein washcoat zone A comprises a compound of a redox active base metal, selected from the group consisting of Cu, Ni, Co, Mn, Fe, Cr, Ce, Pr, Tb, Sn and In, and palladium, with one or both of the compound and palladium being supported on a zeolite and/or a support oxide, and wherein washcoat zone A extends, starting from substrate end a, over a part of the length L, and washcoat zone B comprises the same components as washcoat zone A and an additional amount of palladium and extends from substrate end b over a part of the length L, wherein $L=L_A+L_B$, wherein $L_A$ is the length of washcoat zone A and $L_B$ is the length of washcoat zone B.

2. Catalyst according to claim 1, wherein
washcoat zone A comprises two layers A1 and A2, which both extend over the length $L_A$,
wherein layer A1 comprises zeolite, the compound of a redox active base metal selected from the group consisting of Cu, Ni, Co, Mn, Fe, Cr, Ce, Pr, Tb, Sn and In, and palladium, with the compound being supported on the zeolite, and layer A2 comprises rhodium, and
washcoat zone B comprises two layers B1 and B2, which both extend over the length $L_B$,
wherein layer B1 comprises the same components as layer A1 and layer B2 comprises the same components as layer A2 and
wherein layers B1 and B2 comprise an additional amount of palladium compared to layers A1 and A2.

3. Catalyst according to claim 1, wherein the redox active base metal is copper, manganese or iron.

4. Catalyst according to claim 1, wherein the redox active base metal is iron.

5. Catalyst according to claim 4, wherein the iron compound is in washcoat zones A and B in an amount of 1.0 to 30 g/l, based on the volume of the carrier substrate zone and calculated as $Fe_2O_3$.

6. Catalyst according to claim 4, wherein the zeolite is present and the iron compound and palladium in washcoat zone A are both supported on the zeolite.

7. Catalyst according to claim 6, wherein the iron compound and palladium are present in cationic form within the zeolite structure or in oxidic and metallic form, respectively, within and/or on the surface of the zeolite.

8. Catalyst according to claim 1, wherein the redox active base metal is present in cationic or in oxidic form.

9. Catalyst according to claim 1, wherein the zeolite is present and the zeolite belongs to the structure type code BEA, FAU, FER, MFI or MOR.

10. Catalyst according to claim 1, wherein the zeolite is present and the zeolite is beta zeolite.

11. Catalyst according to claim 1, wherein the zeolite is present in washcoat zones A and B in an amount of 120 to 340 g/l based on the volume of the carrier substrate.

12. Catalyst according to claim 1, wherein the support oxide is present and the support oxide is alumina, silica, magnesia, titania, ceria, zirconia or mixtures or mixed oxides comprising at least two of these materials.

13. Catalyst according to claim 1, wherein palladium is present in cationic, metallic or oxidic form.

14. Catalyst according to claim 1, wherein it comprises palladium is present in washcoat zone A in an amount of 0.04 to 4.0 g/l, based on the volume of the carrier substrate and calculated as palladium metal.

15. Catalyst according to claim 14, wherein palladium is present in washcoat zone B in an amount of 2 to 20 g/l, based on the volume of the carrier substrate and calculated as palladium metal.

16. Catalyst according to claim 15, wherein the compound is an iron compound that is in washcoat zones A and B in an amount of 1.0 to 30 g/l, based on the volume of the carrier substrate zone and calculated as $Fe_2O_3$, and wherein both the zeolite and the support oxide are present with each providing support to one or both of the iron compound and the palladium.

17. Catalyst according to claim 1, wherein palladium is present in washcoat zone B in an amount of 2 to 20 g/l, based on the volume of the carrier substrate and calculated as palladium metal.

18. Catalyst according to claim 1, wherein washcoat zone A extends over 70 to 95% of the length L of the carrier substrate and washcoat zone B extends over 5 to 30% of the length L of the carrier substrate.

19. Catalyst according to claim 1, wherein the carrier substrate of the length L is a flow-through or filter substrate.

20. Method of treating exhaust gases of a combustion engine, wherein the exhaust gas is passed over the catalyst of claim 1, and wherein the exhaust gas enters the catalyst at substrate end a and exits at substrate end b.

* * * * *